Jan. 24, 1956
C. E. FUNK
2,732,182
FENCE BRACE AND TENSIONING MEANS
Filed Oct. 6, 1954
2 Sheets-Sheet 1
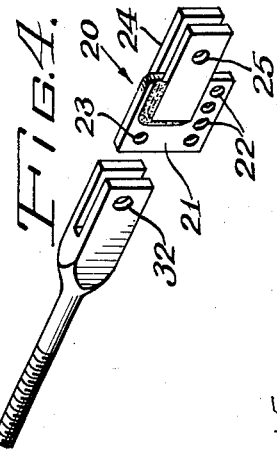
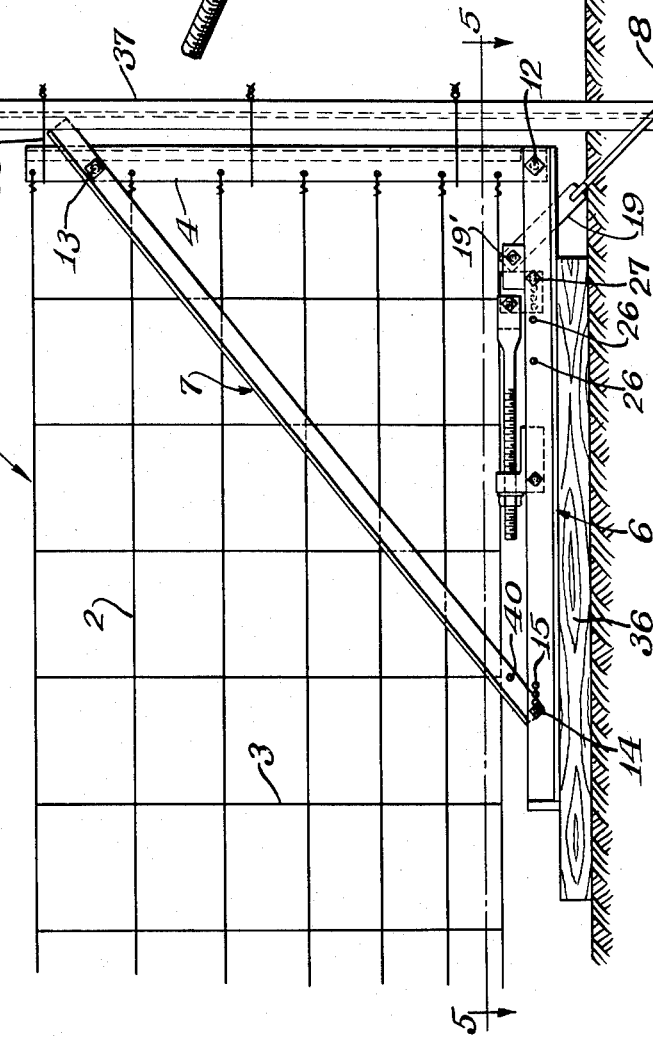
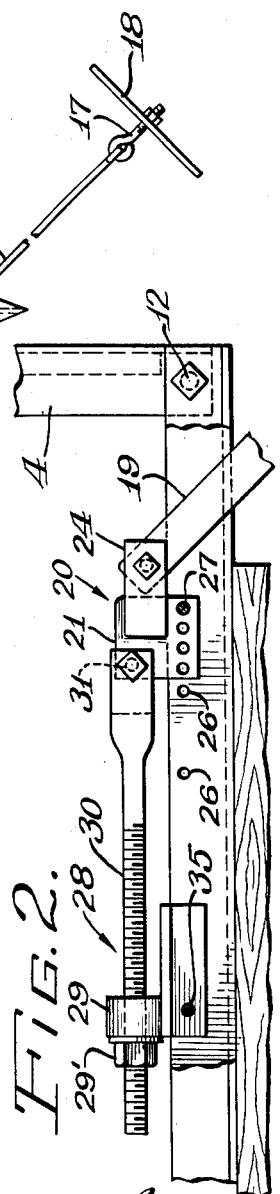
Inventor:
Carl E. Funk
By Gary, Desmond & Parker
Attys.

Jan. 24, 1956  C. E. FUNK  2,732,182
FENCE BRACE AND TENSIONING MEANS
Filed Oct. 6, 1954  2 Sheets-Sheet 2
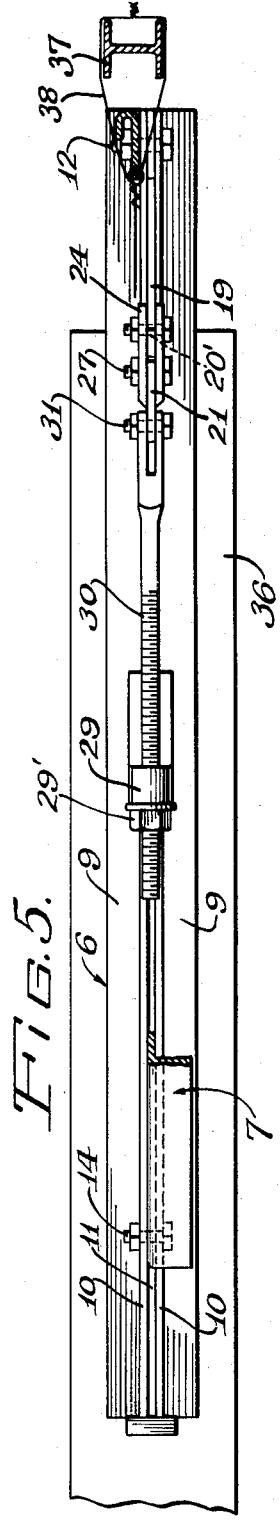
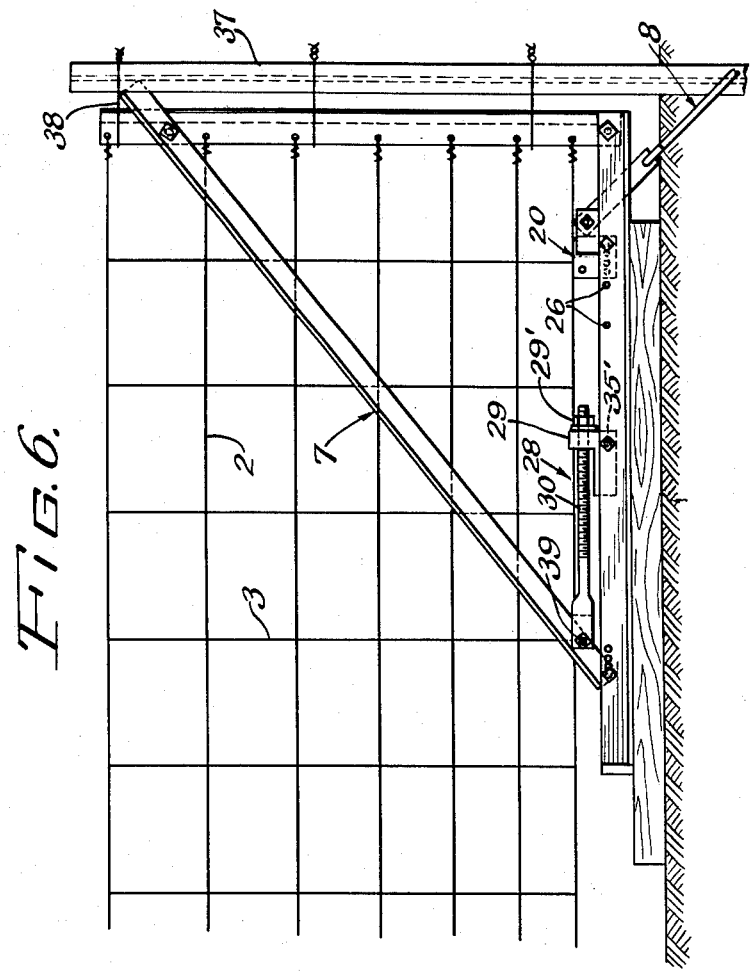
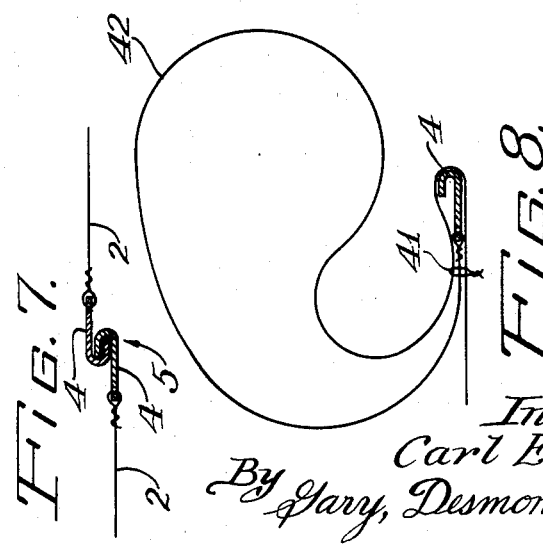
Inventor:
Carl E. Funk
By Gary, Desmond & Parker
Attys.

2,732,182
FENCE BRACE AND TENSIONING MEANS

Carl E. Funk, Earl Park, Ind.

Application October 6, 1954, Serial No. 460,604

8 Claims. (Cl. 256—37)

This invention relates to improvements in a fence erecting, bracing and tensioning means and refers particularly to a device, including a tool for use therewith, whereby a wire fence may be rapidly erected, tensioned and braced.

In the art of farming it is frequently desirable to segregate the available fields for different purposes at different times of the year. For instance, at a predetermined time of the year a predetermined portion of the available ground may be used for a predetermined crop and other portions of the ground may be used for pasturage or the like. At another time of the year, it may be desirable to use the ground previously used for said crop as pasturage and use other portions of the ground for crops or other purposes. It is also desirable in many instances to fence in the different portions of the ground and to move said fence from one portion of the ground to another as occasion demands.

The above described procedure makes a fence that can be quickly and conveniently erected and dismantled most convenient. Accordingly, one of the important features of the present invention resides in a fence construction which can be quickly and conveniently erected, tensioned and braced and which can be quickly and conveniently dismantled whereby the fence may be moved from situs to situs in a most facile manner.

Other objects and advantages of the present invention will be apparent from the accompanying drawings and following detailed description.

In the drawings,

Fig. 1 is an elevational view of an end portion of a wire fence which employs the concepts of the present invention.

Fig. 2 is an enlarged detailed elevation of the portable tool portion of the device in operative position.

Fig. 3 is a perspective view of the tool anchoring sleeve.

Fig. 4 is a perspective view showing the threaded shank of the tool in spaced relationship to the fence anchor lug with which it operates.

Fig. 5 is an enlarged plan sectional view taken on line 5—5 of Fig. 1.

Fig. 6 is a view similar to Fig. 1, illustrating the tool in operative position to independently tension the upper strands of the fence.

Fig. 7 is a diagrammatic top plan sectional view of an intermediate engagement of two fence sections.

Fig. 8 is a view similar to Fig. 7 showing the manner of looping the excess end portion of the fence.

Referring in detail to the drawings, 1 indicates a conventional wire fence having the usual longitudinal strands 2 and cross strands 3. The longitudinal strands 2 at their opposite ends may be secured in any convenient fashion to opposite fence bars 4, only one of which is shown in Figs. 1, 5 and 6.

For convenience in merchandizing, storing and handling the fence 1, it is preferred that it be made in units of predetermined length, each length of fence carrying fence bars 4 at its opposite ends. Each of the fence bars 4 are J-shaped in section and, hence, where the length of the field to be fenced exceeds the length of a fence section, the adjacent end portions of two sections may be engaged, as illustrated at 5 in Fig. 7, that is, the fence may be spliced. In this manner a fence may be built up of any desired member of unit sections.

The complete length of fence, composed of the desired number of unit sections, may at both or at least at one of its terminal ends be associated with an end brace and tensioning device comprising the concepts of the present invention. If one end brace and tensioning device is employed, the opposite end of the fence may be anchored in any suitable fashion by a permanent anchorage, such as a firmly embedded fence post, part of a building or the like. If two bracing and tensioning devices are employed, they will be located at opposite ends of the complete fence and will tension the fence in opposition to each other.

The brace and tensioning device is associated with the fence bar 4 and comprises a base member 6, a diagonal brace 7 and an anchor member 8. The base member 6 comprises a pair of angle irons 9 which are secured together with flanges 10 spaced from each other to provide an elongated slot 11. The lower end portion of the fence bar 4 is pivotally secured to an end portion of the base member 6 by bolt 12, the staff-portion of the J-sectioned fence bar being disposed in the end portion of slot 11. An end portion of the brace 7 is also pivotally secured to the fence bar 6 by means of bolts 13 and the opposite end of the brace is adapted to be secured to an intermediate portion of the base 6 by bolt 14 which is engageable in one of a plurality of holes 15 provided in flanges 10. The brace 7 may conveniently comprise an angle iron and a flange thereof may be disposed in slot 11 when the brace and base member are assembled.

The anchor member 8 comprises an anchor rod 16 which, at one end, is connected to an eye-bolt 17 secured to an anchor plate 18, the latter being of relatively large area and having its plane disposed at an angle to the rod 16. The opposite end of rod 16 is secured to a relatively flat bar 19 which is provided with a bolt hole 20' adjacent its end. An anchor lug 20 also comprises a portion of the anchor member 8 and comprises a plate 21 which is provided with a series of holes 22 disposed in a row adjacent an edge of the plate, and a hole 23 disposed adjacent the opposite edge of the plate. A pair of bars 24, each having a hole 25 are secured to the plate 21, said bars being spaced from each other to form a clevis, between the arms of which bar 19 is pivotally secured by means of bolt 19' which passes through holes 20' and 25.

The flanges 10 of the base member 6 are provided with pairs of aligned, spaced holes 26, the spacing of the holes being substantially equal to the space between the endmost holes of the row of holes 22 in the plate 21 of the anchor lug 20. When the device is assembled, the anchor plate 18 is buried in the ground; the plate 21 is disposed in slot 11 and a bolt 27, positioned in one pair of holes 26 in base 6 and positioned in one of the holes 22 in plate 21, fastens the anchor lug 20 to the base member 6.

A portable tool 28 is adapted to be employed with the end brace and tensioning device, and comprises a tool anchor sleeve 29 which loosely receives shank 30 of a force member, the force member carrying a clevis at one end which is engaged by bolt 31 with anchor lug 20, the bolt extending through aligned holes 32 provided in the clevis and through the bolt hole 23 provided in plate 21. The anchor sleeve 29 carries an anchor flange 33 which is adapted to be positioned in slot 11 between flanges 10 of the base member 6. The flange 33 is provided with a hole 34 through which bolt 35 extends, said bolt also passing through aligned holes provided in the flanges 10 of the base member 6.

In erecting the fence 1 employing the end brace and tensioning device comprising the present invention, the remote end of the fence may be anchored by any suitable means such as a firmly embedded permanent fence post, the side of a building or the like, or the remote end of the fence may be secured to a second end brace and tensioning device. However, in describing the use of the invention it will be assumed that the remote end of the fence is firmly anchored.

The diagonal brace 7 is secured by means of a bolt 14 to the base member 6, the securement being made with an endmost hole 15 provided in the flanges 10 of the base member, as shown in Fig. 1. A hole is then dug in the ground for the reception of the anchor plate 18 which is positioned preferably diagonally in the ground as illustrated in Fig. 1. The anchor lug 20 is loosely positioned in slot 11 between the flanges 10 of the base member 6 and the flange 33 secured to the anchor sleeve 29 is positioned in slot 11 and is secured therein by bolt 35. At the commencement of operations the shank 30 of the force member is positioned within the sleeve 29 with its end portion adjacent said sleeve. The clevis end of the force member is secured to the plate 21 of the anchor lug 20 by means of bolt 31.

A wooden plank 36 may be positioned upon the ground and may serve as a support for the base member 6 and any suitable means may be employed to temporarily hold the fence in a vertical plane until it is tensioned, as will be hereinafter more fully described.

With the parts assembled as described hereinbefore nut 29' is so manipulated as to draw the anchor lug 20 toward the sleeve 29. This movement causes the anchor lug 20 to move in slot 11 relative to the base member 6. This movement is resisted by the anchor assembly 8 and as soon as said assembly assumes a taut position, further movement of nut 29' causes the base member 6 to move toward the anchor assembly. During this movement the base member 6 readily slides over the surface of the plank 36. The manipulation of nut 29' is continued until the tension of the lower strands 2 of the fence has reached a desired degree. Bolt 27 is then inserted through one of the pairs of aligned holes 26 in the flanges 10 and through the closest adjacent hole 22 in plate 21 of the anchor lug 20. As has been hereinbefore described, the spacing of the holes 26 from each other are such that the plate 21 with the holes 22 will always be adjacent a pair of holes 26. Of course, as many pairs of spaced holes 26 as desired may be provided along the length of the flanges 10 whereby the degree to which the fence may be tensioned will be of a wide range. After the bolt 27 has been inserted through the desired holes 26 and 22, said bolt may be fastened. The clevis end of the force member may then be disengaged from the plate 21, that is, bolt 31 may be removed and the nut 29' may be so manipulated as to relieve the force member of any undue tension. The bolt 35 which fastens the flange 33 to the base member may then be removed.

In this fashion the tool 28 performs its function in initially tensioning the fence and it may be removed to perform a similar task elsewhere. By making this tool removable it can readily be seen that one tool can perform its function in conjunction with any number of end brace and tensioning devices and in addition, it is not necessary to leave said tool at the situs of the fence whereby it may rust and the user may encounter difficulty in manipulating it as is the case where the actual tensioning devices comprise a portion of the end brace.

After the lower strands of the fence 1 have been tensioned to a desired degree the clevis end of the force member is secured to an end portion of the diagonal brace 7 by means of bolt 39 which extends through the holes 32 of the clevis and a hole 40 is provided in the flange of the brace 7. The sleeve portion 29 of the tool 28 may be disposed in a reverse position upon the base member 6 as shown in Fig. 6 and bolt 35' may secure the flange 33 in the slot 11. Bolt 14 which temporarily engaged the brace member 7 and the base member 6 is removed and nut 29' may then be manipulated to draw the end portion of the brace member 7 toward the sleeve 29. In drawing the end of the brace member 7 toward the sleeve 29 the fence bar 4 is rocked about bolt 12 in a clockwise direction, as viewed in Figs. 1 and 6, and thus the upper strands of the fence are tensioned.

When the upper strands of the fence are tensioned to substantially the same tension as the lower strands thereof bolt 14 may be inserted through the hole in the end of the flange of the brace member 7 and also through the closest adjacent pair of aligned holes 15 provided in the flanges 10 of the base member 6. Nut 29' may then be loosened to permit the removal of bolt 39 which previously engaged the clevis of the force member with the flange of the brace member. Bolt 35' may then be removed and the tool 28 may be removed from the assembly.

After the fence has been tensioned, in the manner hereinbefore described, a post 37 may be driven into the ground adjacent the fence bar 4 and the fence bar may be bound to the post by wire thongs 38. The only function of post 37 is to hold the fence in a vertical plane since it sustains no tension of the fence, said tension being sustained solely by the anchor assembly 8.

As has been hereinbefore described, the fence is preferably made in units with a fence bar at each end of each unit. It may happen that in erecting a fence, the dimension of the plot being fenced is less than the length of one unit or less than an even multiple of one unit. Rather than sever the fence and thus mutilate one unit to accommodate it to the dimension of the plot, it is preferred that the fence be looped or folded back on itself as suggested in the diagrammatic showing of Fig. 8. In this case, wire thongs 41 may be wrapped about the fence adjacent the fence bar, as shown in Fig. 8, whereby the fence per se may be tensioned without causing the looped portion 42 thereof to slip.

I claim as my invention:

1. A device for adjustably securing an end portion of a flexible fence in tension the opposite end of which is substantially immovably anchored which comprises, a fence bar to which the adjustable end portion of the flexible fence is secured, a base member secured to said fence bar adjacent a lower portion thereof, a brace member secured to said fence bar and base member, whereby said fence bar, said base member and said brace may be moved as a unit away from the anchored end of the fence to tension the fence, an anchor lug positioned for slidable movement upon said base member, an anchor member having an end substantially immovably anchored, the opposite end of said anchor member being connected to said anchor lug, and means engageable with said anchor lug and base member for securing said anchor lug to said base member at a predetermined position along the length of the base member when the fence has been tensioned to sustain the tension of the fence upon the anchor member.

2. A device for adjustably securing an end portion of a flexible fence in tension the opposite end of which is substantially immovably anchored which comprises, a fence bar to which the adjustable end portion of the flexible fence is secured, said fence bar being disposed substantially in the plane of the fence and at an angle to the length of said fence, a base member secured to said fence bar adjacent a lower portion thereof, said base member being disposed substantially in the plane of the fence and at an angle to the fence bar, a brace member secured at spaced portions of its length to said fence bar and base member, an anchor lug positioned for slidable movement along the length of said base member, a substantially immovable anchor member a portion of said anchor member being connected to said anchor lug, and means engageable with said anchor lug and said base member for securing said anchor lug to said base member at a predetermined position along the length of the base member when the fence bar, base member and brace member have been moved relative to said anchor lug and anchor member to tension said fence to sustain the tension of the fence upon the anchor member.

3. A device for adjustably securing an end portion of a flexible fence in tension the opposite end of which is substantially immovably anchored which comprises, a fence bar to which the adjustable end portion of the flexible fence is secured, a base member pivotally secured to said fence bar adjacent a lower portion thereof, a brace member pivotally secured adjacent one end to said fence bar, means for pivotally securing the opposite end of said brace member to said base member at predetermined positions along the length of the base member, an anchor lug positioned for slidable movement upon said base member, a substantially immovable anchor member, a portion of said anchor member being connected to said anchor lug, and means engageable with said anchor lug and said base member for securing said anchor lug to said base member at a predetermined position along the length of the base member when the fence bar, base member and brace member have been moved relative to said anchor lug and anchor member to tension the fence to sustain the tension of the fence upon the anchor member.

4. A device for adjustably securing an end portion of a flexible fence in tension the opposite end of which is substantially immovably anchored which comprises, a fence bar to which the adjustable end of said flexible fence is secured, a base member secured to said fence bar adjacent a lower portion thereof, a substantially immovable anchor member, an anchor lug slidably movable upon said base member and secured to a portion of said anchor member, said anchor lug and said base member being adapted to be movably secured together by a removable tension-producing tool whereby said base member and fence bar may be pulled relative to said anchor lug to tension said fence, and means engageable with said anchor lug and said base member for securing said anchor lug to said base member to maintain the fence in tensioned condition and to permit removal of said tension-producing device.

5. A device for adjustably securing an end portion of a flexible fence in tension the opposite end of which is substantially immovably anchored which comprises, a fence bar to which the adjustable end of said flexible fence is secured, said fence bar being disposed substantially in the plane of the fence, a base member disposed beneath said fence and in substantially the plane of the fence, said base member being secured at one end portion to said fence bar, a brace member secured to said fence bar and base member, an anchor member having an end substantially immovably anchored, an anchor lug slidably movable upon said base member and secured to the opposite end of said anchor member, said anchor lug and said base member being adapted to be movably secured together by a removable tension-producing tool whereby said base member and fence bar may be pulled relative to said anchor lug to tension said fence, and means engageable with said anchor lug and said base member for securing said anchor lug to said base member to maintain the fence in tensioned condition and to permit removal of said tension-producing device.

6. A device for adjustably securing an end portion of a flexible fence the opposite end of which is substantially immovably anchored which comprises, a fence bar to which the adjustable end portion of the fence is secured, said fence bar being disposed substantially in the plane of the fence and at an angle to the length of the fence, a base member pivotally secured to said fence bar adjacent a lower portion thereof, said base member being disposed substantially in the plane of the fence and at an angle to the fence bar, a brace member pivotally secured at one end to said fence bar, the opposite end of said brace member and said base member being adapted to be movably secured together by a removable tension-producing tool whereby said opposite end of said brace member may be moved along the length of said base member to tension the upper portion of said fence, means engageable with said brace member and said base member for securing said opposite end of said brace member to a predetermined portion of said base member to maintain the upper portion of the fence in tension, and anchor means engageable with said base member for substantially immovably anchoring said member.

7. In combination with a device for adjustably securing an end portion of a flexible fence the opposite end of which is substantially immovably anchored, said device comprising a fence bar to which the adjustable end portion of the fence is secured, a base member secured to said fence bar, a base member secured to said fence bar and base member, an anchor lug positioned for slidable movement upon said base member, an anchor member having an end secured to said anchor lug and the opposite end substantially immovably anchored, and means for securing said anchor lug to said base member, of a tension-producing tool comprising a sleeve member for securement to the base member, a threaded force-exerting shank slidably movable with respect to said sleeve, a threaded member engageable with said shank for moving said shank axially through said sleeve, and means engageable with said shank and anchor lug for connecting said shank and said anchor lug to move the base member relative to the anchor member.

8. In combination with a device for adjustably securing an end portion of a flexible fence the opposite end of which is substantially immovably anchored, said device comprising a fence bar to which the adjustable end portion of the fence is secured, a base member secured to said fence bar, a base member secured to said fence bar and base member, an anchor lug positioned for slidable movement upon said base member, an anchor member having an end secured to said anchor lug and the opposite end substantially immovably anchored, and means for securing said anchor lug to said base member, of a tension-producing tool connected to said base member and said anchor lug to move said base member relative to said anchor lug, and means engageable with said anchor lug and said base member for connecting said anchor lug to said base member.

References Cited in the file of this patent

UNITED STATES PATENTS

| 420,717 | Cline | Feb. 4, 1890 |
| 1,188,171 | Hanger | June 20, 1916 |